(12) United States Patent
Edelbrock

(10) Patent No.: US 7,288,896 B2
(45) Date of Patent: Oct. 30, 2007

(54) DEVICE FOR MEASURING AND CORRECTING THE LUMINANCE OF A DISPLAY

(75) Inventor: Ralf Edelbrock, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 556 days.

(21) Appl. No.: 10/927,080

(22) Filed: Aug. 27, 2004

(65) Prior Publication Data

US 2005/0156867 A1    Jul. 21, 2005

(30) Foreign Application Priority Data

Aug. 27, 2003  (DE) ................................ 103 39 503

(51) Int. Cl.
*G09G 3/10* (2006.01)
(52) U.S. Cl. .................... 315/169.3; 315/149; 315/307
(58) Field of Classification Search ............. 315/169.3, 315/307, 291, 149, 158, 150, 151, 157

See application file for complete search history.

(56) References Cited

U.S. PATENT DOCUMENTS 6,836,074 B2 *  12/2004  Nakamura ............... 315/169.3
6,914,389 B2 *   7/2005  Chang et al. ............ 315/169.3

FOREIGN PATENT DOCUMENTS

DE    199 35 458 A1    2/2001
DE    101 38 005 A1    2/2003

* cited by examiner

*Primary Examiner*—David H. Vu
(74) *Attorney, Agent, or Firm*—Sughrue Mion, PLLC

(57) ABSTRACT

A device for measuring and correcting the luminance of a flat screen display, which can be illuminated from the rear by the light of a backlight, having a backlight control, which adjusts a luminance measured by a sensor to a selectable setpoint value representing the intensity of the light of the backlight. The sensor is arranged in an area of the flat screen display device that is not visible to a viewer, and a swivel is provided to swivel the sensor out, essentially parallel to the display panel, from a standby position to a position for measuring the luminance of a test image that can be displayed on the display panel during a calibration phase. As a result, effects due to aging and/or temperature of the display panel and interfering with the luminance of the display panel are detected and can be largely corrected.

18 Claims, 3 Drawing Sheets

1) Graphics processor
2) Backlight control
3) LCD panel
4) Sensor
5) Sensor holder
6) Backlight Bs = Backlight sensor 1) Graphics processor
2) Backlight control
3) LCD panel
4) Sensor
5) Sensor holder
6) Backlight Bs = Backlight sensor

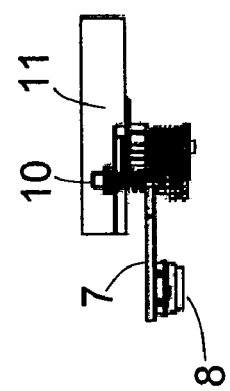
Fig 3c
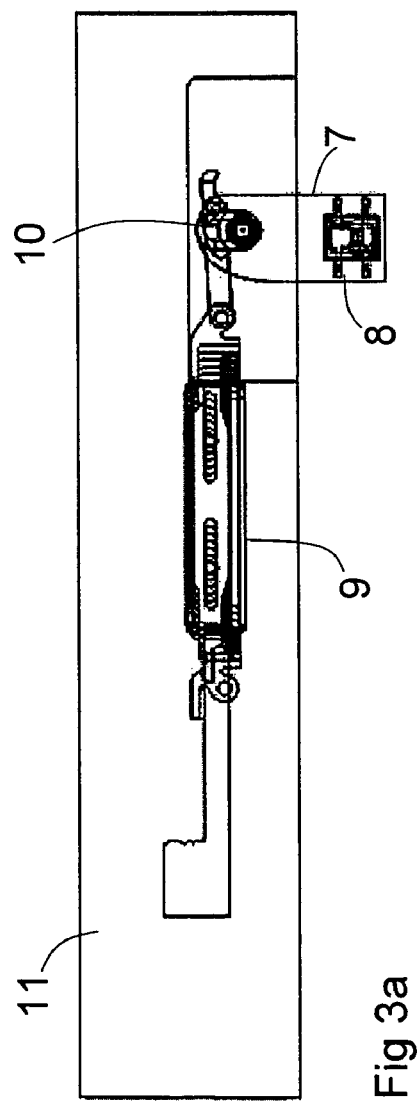
Fig 3a
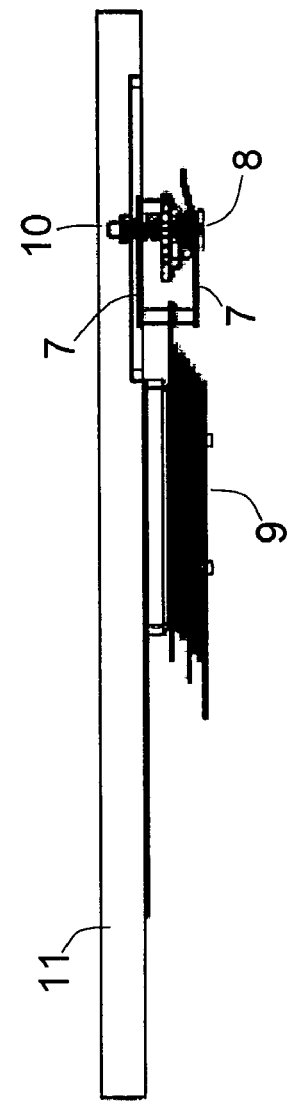
Fig 3b
FIG 3

DEVICE FOR MEASURING AND CORRECTING THE LUMINANCE OF A DISPLAY

The following disclosure is based on German Patent Application No. 103 39 503.2, filed on Aug. 27, 2003, which is incorporated into this application by reference in its entirety.

FIELD AND BACKGROUND OF THE INVENTION

The present invention relates to a device for use with a display panel, and particularly for use with a flat screen display panel, which can be illuminated from the rear by means of a backlight, having a backlight control to adjust a luminance measured by a sensor to a selectable setpoint value, which represents the intensity of the backlight.

To control the luminance of a backlight for a liquid crystal display ("LCD") panel and flat screen LCD displays, a backlight control is usually provided. This backlight control adjusts the luminance of the backlight illuminating the display panel from the rear and measured by a sensor to an essentially constant setpoint value. The drawback is that such a backlight control measures and regulates only the luminance of the backlight, while influences affecting the luminance of an image displayed on the display panel are not measured and, therefore, can not be corrected. For example, it is not possible to measure and to correspondingly correct effects that interfere with the luminance of the image due to aging of the glass, the LCD fluid, or the diffuser and/or polarization foils of the display panel.

The German application with the official file number 10323221.4 proposes to arrange transparent parts between a sensor and a backlight whose aging and temperature properties essentially correspond to those of the transparent parts of the display panel. The sensor measures the luminance of these transparent parts, which a backlight control adjusts to a selectable setpoint value, such that effects due to aging and/or the temperature of the display panel that interfere with the luminance of an image displayed on a flat screen display panel are largely avoided. The drawback is that, for example, the temperature influences within the flat screen and outside the flat screen differ, so that the luminance can only be detected imprecisely.

OBJECTS OF THE INVENTION

An object of the present invention is to provide a device for use with a display panel, and particularly for use with a flat screen display panel, which makes it possible to measure and to largely correct effects due to influences such as aging and/or temperature of the display panel, for example, which interfere with the luminance of the display panel.

This object and others are attained by arranging a sensor in an area of the flat screen display device that is not visible to a viewer and by providing a means to move the sensor, during a calibration phase, from a standby position to a measuring position, essentially parallel to the display panel, in order to measure the luminance of a test image that can be displayed on the display panel.

Such a device has an advantage, for example, that effects interfering with the luminance of an image due to aging of the transparent parts of the display panel (e.g., aging of the display panel glass, the LCD fluid, or the diffuser and/or polarization foils) are reduced. Such a device has the further advantage that the sensor is only visible above the display surface during a calibration phase. The present invention makes it possible, in particular, to meet the requirements in the medical field in view of prescribed calibration cycles for adjusting the luminance of an image. For example, the luminances of a test image can be measured at intervals of three months and can be taken into account when the backlight is adjusted for a subsequent period.

In one illustrative and non-limiting embodiment of the present invention, a display device includes a display panel of a flat screen, which is illuminated from the rear by light of a backlight; a sensor; a backlight control, which adjusts the light intensity of the backlight to a selectable setpoint value based on a luminance measured by the sensor; a swivel means for swiveling the sensor; wherein, in a standby position, the sensor is arranged in an area of the display device that is not visible to a viewer; and wherein the swivel means is configured to swivel out the sensor during a calibration phase, from the standby position to a measurement position substantially parallel to the display panel for measuring the luminance of a test image that is displayed on the display panel.

In another illustrative and non-limiting embodiment consistent with the present invention, the sensor can be lowered toward the display panel to reduce the distance between the sensor and the display panel so as to obtain better measurement results.

The measurement results are further improved by providing a sealing means to shield the sensor from ambient light. This sealing means (e.g., in the form of sealing lips) prevents the ambient light from affecting the measurement results.

In a further illustrative and non-limiting embodiment of the present invention, the sensor is automatically cleaned. As a result, contamination of the sensor that would affect the measurement results is largely avoided and, moreover, sensor maintenance intervals can be increased.

Advantageously the sensor and the means for swiveling the sensor out are arranged in a recess of the frame, preferably the lateral frame of the flat screen. As a result, the sensor and the swiveling means are not visible to a viewer during normal operation (i.e., outside of the calibration phases).

In another illustrative and non-limiting embodiment of the present invention, an apparatus includes a display panel of a flat screen; a backlight configured to illuminate the display panel from the rear; a sensor configured to measure a luminance; a backlight control configured to adjust the intensity of the backlight to a selectable setpoint value based on the luminance measured by the sensor; a swivel configured to swivel the sensor; wherein, in a standby position, the sensor is arranged in an area that is not visible to a viewer; and wherein the swivel is configured to swivel out the sensor during a calibration phase, from the standby position to a measurement position, substantially parallel to the display panel, for measuring the luminance of a test image that is displayed on the display panel.

BRIEF DESCRIPTION OF THE DRAWINGS

The present invention, its embodiments, and advantages will now be described in greater detail with reference to illustrative and non-limiting embodiments of the present invention depicted in the drawings, in which:

FIG. 3a shows a sensor arranged on a sensor holder, in a measurement position, from a front view;

FIG. 3b shows a sensor arranged on a sensor holder, in a measurement position, from a side view; and FIG. 3c shows a sensor arranged on a sensor holder, in a measurement position, from a top view.

DETAILED DESCRIPTION OF THE PREFERRED EMBODIMENTS

Figure 1:
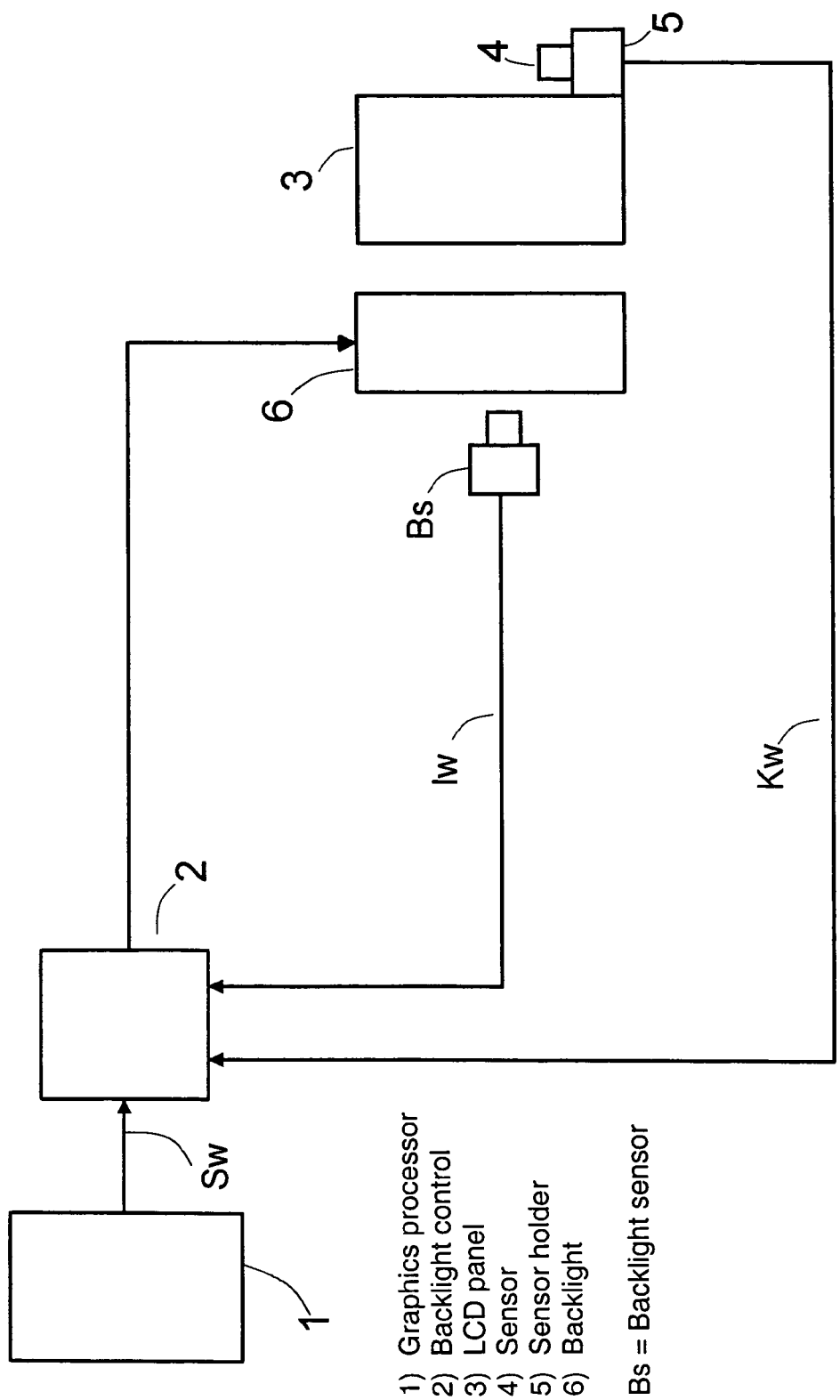
FIG. 1 shows a device for adjusting the luminance of a backlight for an LCD panel.

In FIG. 1, 1 identifies a graphics processor, which can be supplied with digitized image information (not depicted) for display on an LCD panel 3 of a flat screen display. The graphics processor 1 transmits a selectable setpoint value Sw to the backlight control 2. The backlight control 2 adjusts the luminance of the LCD panel 3 substantially constantly to a desired luminance that corresponds to the setpoint value Sw. In a factory setting, the setpoint value Sw is defined such that the luminance of an image that can be displayed on the LCD panel 3 imparts an optimal impression of the image. To adjust the luminance, a backlight sensor Bs is provided to measure the light from a backlight 6, which illuminates the LCD panel 3 from the rears and the light intensity of which effects a corresponding luminance on the LCD panel 3. The backlight sensor Bs feeds an actual value Iw corresponding to this luminance of the backlight 6 to the backlight control 2, which adjusts this actual value Iw to the setpoint value Sw.

When the flat screen is used, for example, in the medical field, it may occur that, for example, influences such as aging and/or temperature or other environmental influences, have a negative effect on the luminance of the LCD panel 3. To largely prevent these influences, the present invention provides that during a calibration phase, a measuring unit on the front of the LCD panel 3 scans the optical image information of a test image displayed on the LCD panel (e.g., a white test image) and thereby measures the luminance of this test image. The measuring unit feeds a correction luminance value Kw corresponding to this luminance of the test image to the backlight control 2. The test image does not need to fill the display panel completely. It is sufficient to display the test image in a "calibration window," such that the test image can be overlaid in this window even while an image is being displayed in a normal operating phase of the flat screen. Components of the measuring unit are a sensor 4 and a sensor holder 5 on which the sensor 4 is mounted. The sensor 4 and sensor holder 5 are arranged in a recess in the frame of the flat screen so that they are not visible to a viewer. To be able to measure the luminance of the test image during the calibration phase, the sensor 4 can be swiveled out from a standby position to a measurement position essentially parallel to the display panel in which the sensor 4 is visible to the viewer. The sensor 4 is preferably lowered toward the LCD panel 3 as it is swiveled out such that the sensor 4 can readily measure the luminance without touching the LCD panel 3. After the calibration phase, the sensor 4 is swiveled back into its standby position in which the sensor 4 and the sensor holder 5 are again positioned in the recess of the flat screen so that they are not visible to the viewer.

The backlight control 2 uses the luminance correction value Kw to adjust the actual value Iw to largely eliminate effects due to aging, and/or temperature, or other environmental influences on the luminance of the LCD panel 3. The correction value Kw changes the deviation between the setpoint value and the actual value, which is evaluated by a control algorithm of the backlight control 2. The automatic control is effected by a corresponding adjustment of the light of a backlight 6, which illuminates the LCD panel 3 from the rears and the light intensity of which causes a corresponding luminance on the display panel.

To prevent ambient light from interfering with the measurement of the luminance, sealing lips (not depicted) can be provided, which shield the sensor 4 from the ambient light.

Figure 2:
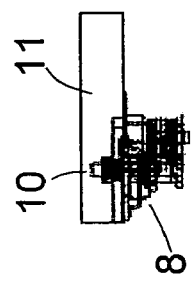
FIG. 2a shows a sensor arranged on a sensor holder, in a standby position, from a front view.
FIG. 2b shows a sensor arranged on a sensor holder, in a standby position, from a side view.
FIG. 2c shows a sensor arranged on a sensor holder, in a standby position, from a top view.
Figure 2:
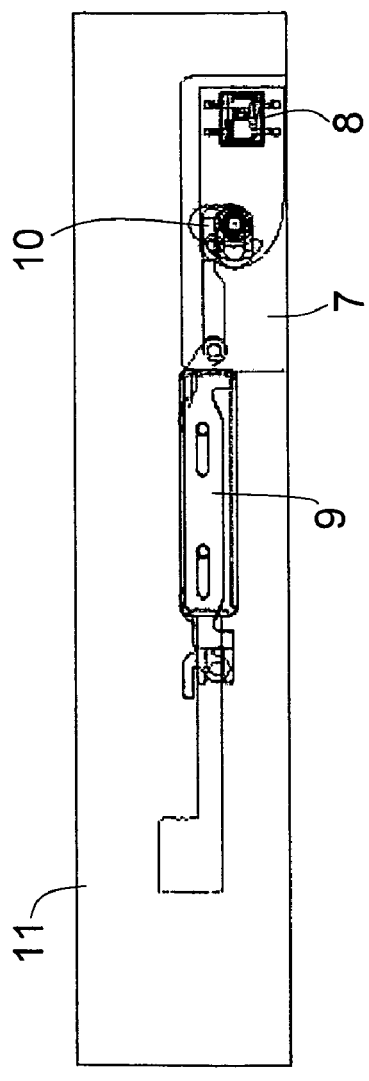
Figure 2:
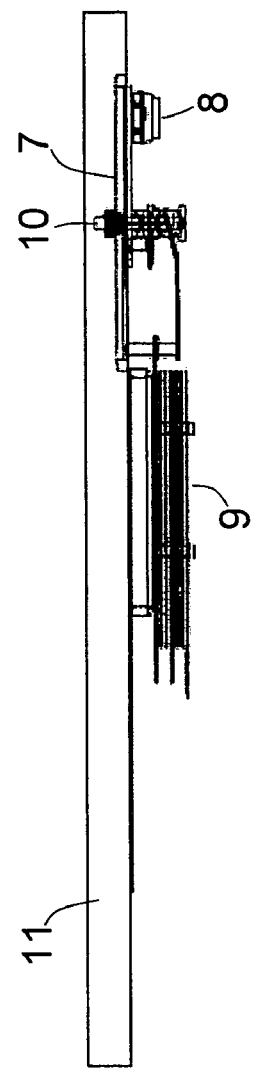

Reference is now made to FIGS. 2a, 2b, 2c, 3a, 3b, and 3c, which depict a sensor 8 arranged on a sensor holder 7 in a front view (FIGS. 2a, 3a), a side view (FIGS. 2b, 3b), and a top view (FIGS. 2c, 3c). The sensor holder 7 is rotatable and can be pivoted by an actuator 9 and mechanical means 10. The actuator 9, e.g., an actuator made by NanoMuscle (Internet address: http.nanomuscle.com), together with the sensor holder 7 and the sensor 8, is arranged in a recess of a frame of a flat screen, preferably on a vertical portion of the frame, and is mounted on a base plate 11, which is arranged parallel to the frame and is covered by the frame. Thus, in a standby position (as shown, for example, in FIGS. 2a, 2b, and 2c) the base plate 11, the mechanical means 10, the actuator 9, the sensor 8, and the sensor holder 7 are not visible to a person looking at the display panel. In a measurement position during a calibration phase (as shown, for example, in FIGS. 3a, 3b, and 3c), in which the sensor 8 measures the luminance of a display panel, the sensor holder 7, together with the sensor 8, is swiveled by 90°. During the swivel process, the sensor holder 7 is simultaneously lowered toward the display panel surface (indicated in FIGS. 3b and 3c by the lowering height H) to position the sensor 8 closer to the display panel surface. Optional sealing lips (not depicted) prevent the ambient light from distorting the measurement results. Once the sensor 8 has been positioned, it measures the luminance of the test image displayed on the display panel in a calibration window for the duration of the calibration phase. The calibration window can be, for example, overlaid onto the normal image. After the calibration phase, the sensor 7 is swiveled back into its standby position.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the present invention, as defined by the appended claims, and equivalents thereof.

The invention claimed is:

1. A display device comprising:
    a display panel for a flat screen, which is illuminated from the rear by light from a backlight;
    a sensor, which measures luminance;
    a backlight control, which adjusts the light intensity of the backlight to a selected setpoint value based on the luminance measured by the sensor; and
    a swivel means for swiveling the sensor;
    wherein, in a standby position, the sensor is arranged in an area of the display device that is not visible to a viewer; and
    wherein the swivel means swivels out the sensor, substantially parallel to the display panel, during a calibration phase, from the standby position to a measurement position, for measuring the luminance of a test image that is displayed on the display panel.

2. A display device as claimed in claim 1, wherein the swivel means lowers the sensor toward the display panel when the sensor is swiveled out.

3. A display device as claimed in claim 1, further comprising a shielding means for shielding the sensor from ambient light while the luminance is being measured.

4. A display device as claimed in claim 3, wherein the shielding means comprises sealing lips.

5. A display device as claimed in claim 1, further comprising a cleaning means for cleaning the sensor while the sensor is swiveled out into the measurement position.

6. A display device as claimed in claim 1, wherein the sensor and the swiveling means are arranged in a recess of a frame of the flat screen.

7. A display device as claimed in claim 1, further comprising a cleaning means for cleaning the sensor while the sensor is swiveled back into the standby position.

8. A display device as claimed in claim 1, wherein the test image is displayed in a window on the display panel which is smaller in size than the display panel.

9. A display device as claimed in claim 1, wherein the test image is displayed in a window on the display panel while an image is being displayed on the display panel in a normal operating phase of the display panel.

10. A display apparatus comprising:
a display panel;
a backlight configured to illuminate the display panel from the rear;
a sensor configured to measure a luminance, and arranged, in a standby position, in an area that is not visible to a viewer;
a backlight control configured to adjust the intensity of the backlight to a setpoint value based on the luminance measured by the sensor;
a swivel configured to swivel the sensor, during a calibration phase and substantially parallel to the display panel, from the standby position to a measurement position, to measure the luminance of a test image that is displayed on the display panel.

11. A display apparatus as claimed in claim 10, wherein the swivel is configured to lower the sensor toward the display panel when the sensor is swiveled out.

12. A display apparatus as claimed in claim 10, further comprising a shield configured to shield the sensor from ambient light while the luminance is measured.

13. A display apparatus as claimed in claim 12, wherein the shield comprises sealing lips.

14. A display apparatus as claimed in claim 10, further comprising a cleaner configured to clean the sensor while the sensor is swiveled out into the measurement position.

15. A display apparatus as claimed in claim 10, wherein the sensor and the swivel are arranged in a recess of a frame of the display panel.

16. A display apparatus as claimed in claim 10, further comprising a cleaner configured to clean the sensor while the sensor is swiveled back into the standby position.

17. A display apparatus as claimed in claim 10, wherein the test image is displayed in a window on the display panel which is smaller in size than the display panel.

18. A display apparatus as claimed in claim 10, wherein the test image is displayed in a window on the display panel while an image is being displayed on the display panel in a normal operating phase of the display panel.

* * * * *